United States Patent
Kim et al.

(10) Patent No.: US 10,141,608 B2
(45) Date of Patent: Nov. 27, 2018

(54) ELECTROLYTE FOR LITHIUM SECONDARY BATTERY AND LITHIUM SECONDARY BATTERY CONTAINING THE SAME

(71) Applicant: SK Innovation Co., Ltd., Seoul (KR)

(72) Inventors: Jin Sung Kim, Daejeon (KR); Cheol Woo Kim, Daejeon (KR); Sung Yon Oh, Daejeon (KR); Kwang Kuk Lee, Daejeon (KR); Seong Il Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 17 days.

(21) Appl. No.: 15/168,452

(22) Filed: May 31, 2016

(65) Prior Publication Data

US 2016/0359196 A1   Dec. 8, 2016

(30) Foreign Application Priority Data

Jun. 8, 2015 (KR) .................. 10-2015-0080481

(51) Int. Cl.
| | | |
|---|---|---|
| *H01M 10/0567* | (2010.01) | |
| *H01M 10/0525* | (2010.01) | |
| *H01M 10/0569* | (2010.01) | |
| *H01M 10/0568* | (2010.01) | |

(52) U.S. Cl.
CPC ... *H01M 10/0567* (2013.01); *H01M 10/0525* (2013.01); *H01M 10/0569* (2013.01); *H01M 10/0568* (2013.01); *H01M 2300/0037* (2013.01)

(58) Field of Classification Search
CPC ......... H01M 10/0567; H01M 10/0569; H01M 10/0525; H01M 2300/0037; H01M 10/0568
See application file for complete search history.

(56) References Cited

U.S. PATENT DOCUMENTS

| | | | |
|---|---|---|---|
| 5,879,834 A | 3/1999 | Mao | |
| 2001/0038949 A1* | 11/2001 | Hatazaki | H01M 10/0567 429/324 |
| 2015/0280282 A1* | 10/2015 | Nishie | H01M 10/052 429/200 |

FOREIGN PATENT DOCUMENTS

| | | | |
|---|---|---|---|
| JP | 2002260725 A | | 9/2002 |
| WO | WO 2014/068805 | * | 5/2014 |

* cited by examiner

*Primary Examiner* — Cynthia K Walls
(74) *Attorney, Agent, or Firm* — The Webb Law Firm

(57) ABSTRACT

Provided are an electrolyte for a lithium secondary battery and a lithium secondary battery containing the same. The electrolyte for a secondary battery according to the present invention has excellent high-temperature stability, excellent low-temperature discharge capacity, and excellent life cycle characteristics.

18 Claims, No Drawings

ELECTROLYTE FOR LITHIUM SECONDARY BATTERY AND LITHIUM SECONDARY BATTERY CONTAINING THE SAME

CROSS-REFERENCE TO RELATED APPLICATION

This application claims priority to Korean Patent Application No. 10-2015-0080481 filed Jun. 8, 2015, the disclosure of which is hereby incorporated in its entirety by reference.

TECHNICAL FIELD

The following disclosure relates to an electrolyte for a lithium secondary battery, and a lithium secondary battery containing the same.

BACKGROUND

Recently, as portable electronic devices have widely spread, in accordance with miniaturization, thinness, and lightness of the portable electronic devices, research into a secondary battery used as a power source for these portable electronic devices, which may have a small size and a light weight and be charged and discharged for a long period of time, has been actively conducted.

The lithium secondary battery, which generates electrical energy by oxidation-reduction reactions when lithium ions are intercalated into and deintercalated from a cathode and an anode, is manufactured by using a material capable of intercalating and deintercalating lithium ions as the anode and the cathode, and filling an organic electrolyte or polymer electrolyte between the cathode and the anode.

An example of an organic electrolyte widely used at the present time includes ethylene carbonate, propylene carbonate, dimethoxyethane, gamma butyrolactone, N,N-dimethylformamide, tetrahydrofuran, acetonitrile, or the like. However, generally, since the organic electrolyte as described above may be easily volatilized and have high flammability, at the time of applying the organic electrolyte to a lithium ion secondary battery, a safety problem, for example, ignition due to an internal short-circuit when heat is generated in the battery by over-charge or over-discharge, or the like, may occur at a high temperature.

Further, at the time of initial charge of the lithium secondary battery, lithium ions released from a lithium metal oxide, which is a cathode, move to a carbon electrode, which is an anode, to thereby be intercalated into carbon. In this case, since lithium has high reactivity, while a surface of carbon particles, which is an anode active material, and an electrolyte react with each other, a coating film referred to as a solid electrolyte interface (SEI) film is formed on a surface of the anode.

Performance of the lithium secondary battery significantly depends on a configuration of the organic electrolyte and the SEI film formed by a reaction of the organic electrolyte and the electrode.

That is, the formed SEI film may suppress side reactions of a carbon material and an electrolyte solvent, for example, decomposition of the electrolyte on the surface of the carbon particle, which is the anode, prevent disintegration of an anode material caused by co-intercalation of the electrolyte solvent into the anode material, and serve as a lithium ion tunnel according to the related art, thereby minimizing deterioration in performance of the battery.

Therefore, various researches for developing a novel organic electrolyte containing an additive in order to solve the above-mentioned problem have been conducted.

For example, a non-aqueous lithium ion battery capable of preventing over-charge current and a thermal runaway phenomenon caused by the over-charge current by using an aromatic compound such as biphenyl has been disclosed in Japanese Patent No. 2002-260725. In addition, a method of improving safety of a battery by adding a small amount of an aromatic compound such as biphenyl, 3-chlorothiophene, or the like, to increase an internal resistance by electrochemical polymerization in an abnormal over-voltage state has been disclosed in U.S. Pat. No. 5,879,834. However, in the case of using the additive such as biphenyl, or the like, there are problems in that when a relatively high voltage is locally generated in a general operation voltage, the additive is gradually decomposed during a charge and discharge process, or when the battery is discharged at a high temperature for a long period of time, an amount of biphenyl, or the like, may be gradually decreased, such that safety may not be secured after 300 charge and discharge cycles. In addition, there is a problem in storage characteristics, or the like.

Therefore, research for improving safety at high and low temperatures while still having a high capacity retention rate has been continuously demanded.

SUMMARY

An embodiment of the present invention is directed to providing an electrolyte for a lithium secondary battery capable of having excellent high-temperature storage characteristics and excellent low-temperature discharge characteristics by significantly decreasing a swelling phenomenon of a battery due to oxidation/decomposition of the electrolyte at the time of keeping the battery at a high temperature in a high voltage state, while properly maintaining basic performance such as high-rate charge and discharge characteristics, life cycle characteristics, and the like, and a lithium secondary battery containing the same.

In one general aspect, an electrolyte for a lithium secondary battery contains:
a lithium salt;
a non-aqueous organic solvent; and
a cyclic sulfate compound represented by the following Chemical Formula 1:

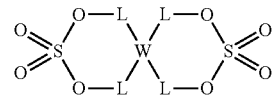

[Chemical Formula 1]

(in Chemical Formula 1,
W is

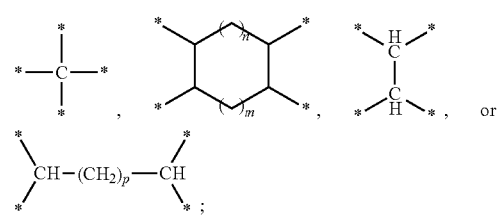

, or

L is a single bond or methylene; and m is an integer of 1 to 4, n is an integer of 0 to 2, and p is an integer of 0 to 6.)

The cyclic sulfate compound represented by Chemical Formula 1 may be represented by Chemical Formulas 2 to 5.

[Chemical Formula 2]
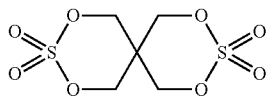

[Chemical Formula 3]
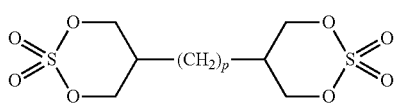

[Chemical Formula 4]
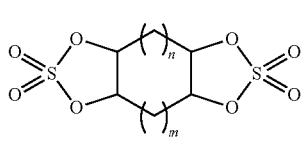

[Chemical Formula 5]
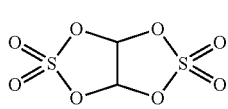

(In the Chemical Formulas, m is an integer of 1 to 4, n is an integer of 0 to 2, and p is an integer of 0 to 6.)

The cyclic sulfate compound represented by Chemical Formula 3 may be selected from compounds having the following structures, but is not limited thereto.

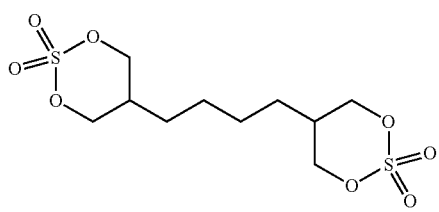

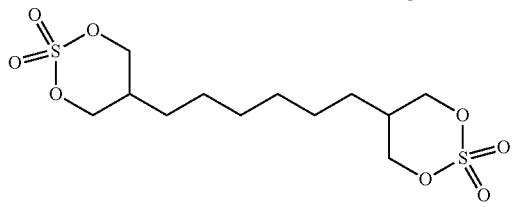

The cyclic sulfate compound represented by Chemical Formula 4 may be selected from compounds having the following structures, but is not limited thereto.

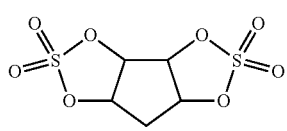

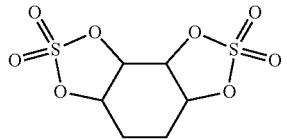

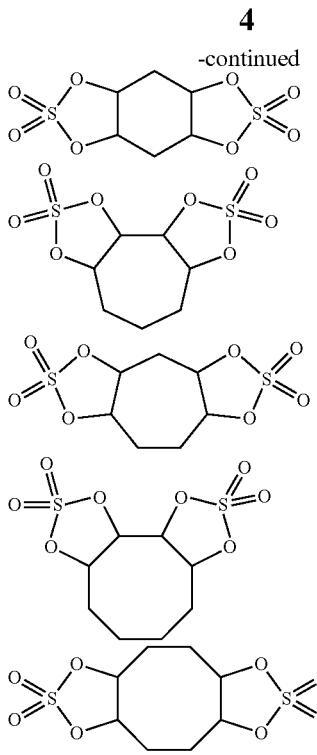

The electrolyte may further contain a cyclic sulfite compound represented by the following Chemical Formula 6.

[Chemical Formula 6]

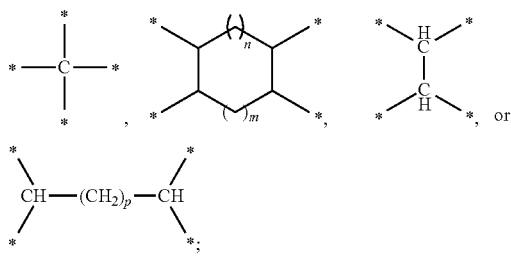

(In Chemical Formula 6,

W is

L is a single bond or methylene; and m is an integer of 1 to 4, n is an integer of 0 to 2, and p is an integer of 0 to 6.)

The cyclic sulfite compound represented by Chemical Formula 6 may be represented by Chemical Formulas 7 to 10.

[Chemical Formula 7]
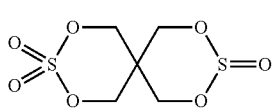

[Chemical Formula 8]

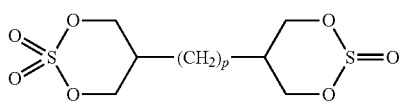

[Chemical Formula 9]

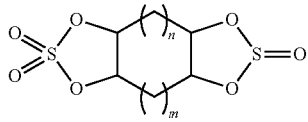

[Chemical Formula 10]

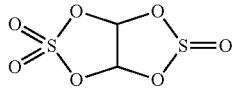

(In the Chemical Formulas, m is an integer of 1 to 4, n is an integer of 0 to 2, and p is an integer of 0 to 6.)

The cyclic sulfite compound represented by Chemical Formula 8 may be selected from compounds having the following structures, but is not limited thereto.

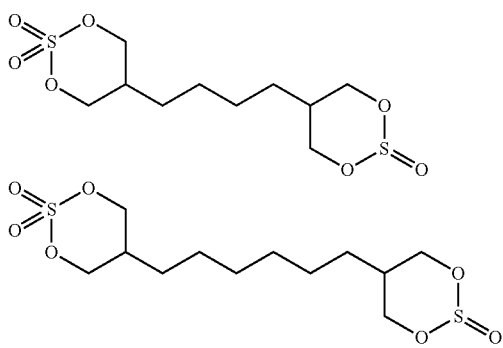

The cyclic sulfite compound represented by Chemical Formula 9 may be selected from compounds having the following structures, but is not limited thereto.

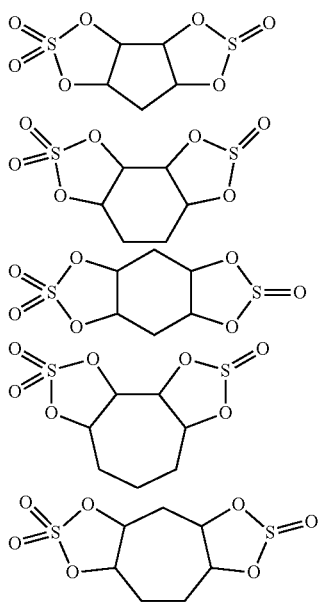

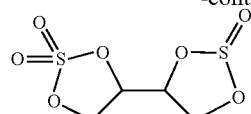

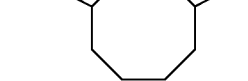

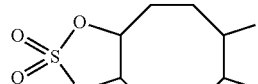

The cyclic sulfate compound represented by Chemical Formula 1 may be contained at a content of 0.1 to 5.0 wt % based on a total weight of the electrolyte.

The cyclic sulfite compound represented by Chemical Formula 6 may be contained at a content of 0.001 to 20 mol % based on a total mole of the cyclic sulfate compound represented by Chemical Formula 1 and the cyclic sulfite compound represented by Chemical Formula 6.

The electrolyte may further contain one or two or more additives selected from the group consisting of oxalatoborate based compounds, carbonate based compounds substituted with fluorine, vinylidene carbonate based compounds, and compounds containing a sulfinyl group.

The electrolyte may further contain an additive selected from the group consisting of lithium difluoro(oxalato)borate (LiFOB), lithium bis(oxalato)borate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

The additive may be contained at a content of 0.1 to 5.0 wt % based on a total weight of the electrolyte.

The non-aqueous organic solvent may be selected from cyclic carbonate based solvents, linear carbonate based solvent, and a mixed solvent thereof, wherein the cyclic carbonate may be selected from the group consisting of ethylene carbonate, propylene carbonate, butylene carbonate, vinylene carbonate, vinylethylene carbonate, fluoroethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

The non-aqueous organic solvent may be a mixed solvent in which the linear carbonate solvent and the cyclic carbonate solvent are mixed at a mixed volume ratio of 1:1 to 9:1.

The lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (here, x and y are natural numbers), LiCl, LiI, and $LiB(C_2O_4)_2$.

The lithium salt may be contained at a concentration of 0.1 to 2.0 M.

In another general aspect, a lithium secondary battery contains the electrolyte for a lithium secondary battery as described above.

DETAILED DESCRIPTION OF EMBODIMENTS

Hereinafter, the present invention will be described in more detail. Here, technical terms and scientific terms used in the present specification have the general meaning understood by those skilled in the art to which the present invention pertains unless otherwise defined, and a description for the known function and configuration unnecessarily obscuring the gist of the present invention will be omitted in the following description.

The present invention relates to an electrolyte for a lithium secondary battery in order to provide a battery having significantly excellent discharge capacity at a low temperature while having excellent high-temperature storage characteristics and life cycle characteristics.

The present invention provides an electrolyte for a lithium secondary battery containing a lithium salt; a non-aqueous organic solvent; and a cyclic sulfate compound represented by the following Chemical Formula 1:

[Chemical Formula 1]

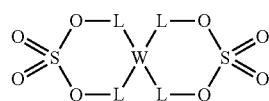

(In Chemical Formula 1,
W is

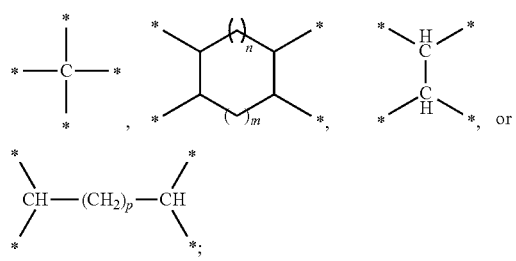

L is a single bond or methylene; and
m is an integer of 1 to 4, n is an integer of 0 to 2, and p is an integer of 0 to 6.)

As the electrolyte for a secondary battery according to the present invention contains the cyclic sulfate compound represented by Chemical Formula 1, a capacity recovery rate at a high temperature may be high, and a thickness change rate may be low, such that the electrolyte may be more stable at a high temperature.

More specifically, in the compound represented by Chemical Formula 1, two cyclic sulfates are connected via a spiro bond, fused with each other, or linked with each other via a single bond or alkylene, such that the compound may be decomposed at an anode to more effectively form a SEI film while lowering resistance of a battery, thereby making it possible to improve high-temperature and low-temperature characteristics.

In the electrolyte for a lithium secondary battery according to an exemplary embodiment of the present invention, in a case in which L of the cyclic sulfate compound represented by Chemical Formula 1 is methylene, W may be

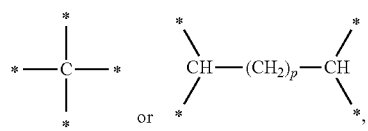

and in a case in which L is the single bond, W may be

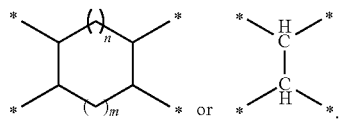

In the electrolyte for a lithium secondary battery according to the exemplary embodiment of the present invention, in view of chemical stability and electrical characteristics, preferably, the cyclic sulfate compound represented by Chemical Formula 1 may be represented by Chemical Formulas 2 to 5.

[Chemical Formula 2]

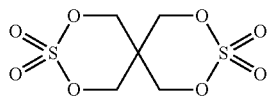 [SMILES: O=S1(=O)OCC2(CO1)COS(=O)(=O)OC2]

[Chemical Formula 3]

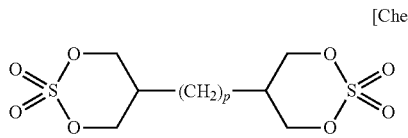

[Chemical Formula 4]

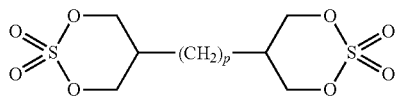

[Chemical Formula 5]

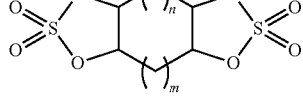

(In the Chemical Formulas, m is an integer of 1 to 4, n is an integer of 0 to 2, and p is an integer of 0 to 6.)

In view of chemical stability and electrical characteristics, the cyclic sulfate compounds represented by Chemical Formulas 2 to 5 may be preferable, and the cyclic sulfate compounds represented by Chemical Formulas 2 and 5 may be more preferable.

In the electrolyte for a lithium secondary battery according to the exemplary embodiment of the present invention, the cyclic sulfate compound represented by Chemical Formula 3 may be selected from compounds having the following structures, but is not limited thereto.

3-1

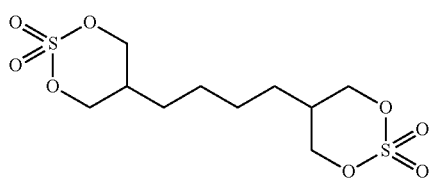

3-2
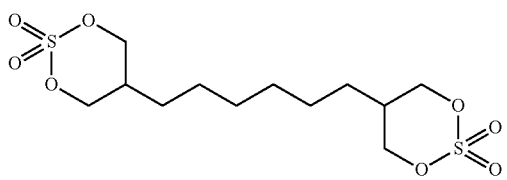

[Chemical Formula 6]
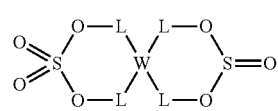

(In Chemical Formula 6,
W is

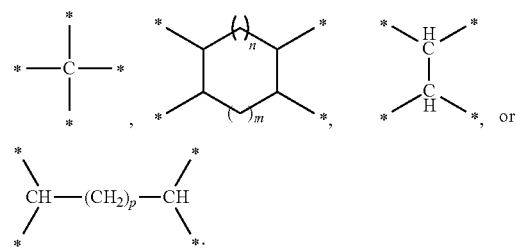

In the electrolyte for a lithium secondary battery according to the exemplary embodiment of the present invention, the cyclic sulfate compound represented by Chemical Formula 4 may be selected from compounds having the following structures, but is not limited thereto.

4-1
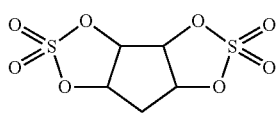

4-2
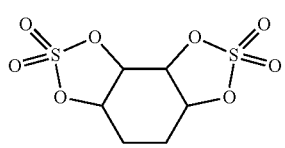

4-3
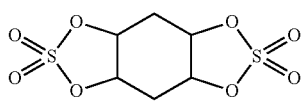

4-4
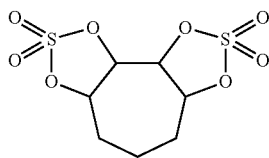

4-5
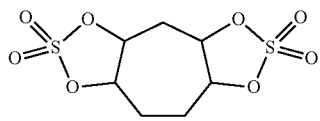

4-6
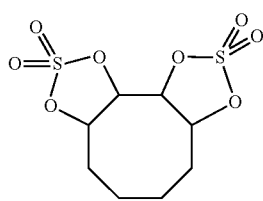

4-7
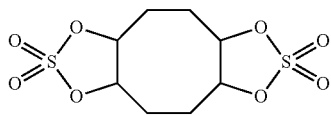

L is a single bond or methylene; and m is an integer of 1 to 4, n is an integer of 0 to 2, and p is an integer of 0 to 6.)

The cyclic sulfite compound represented by Chemical Formula 6, which is a side product produced during a process of preparing the cyclic sulfate compound represented by Chemical Formula 1, may be mixed with the cyclic sulfate compound represented by Chemical Formula 1 in the electrolyte in a range in which a desired effect is not inhibited.

In the electrolyte for a lithium secondary battery according to an exemplary embodiment of the present invention, in a case in which L of the cyclic sulfite compound represented by Chemical Formula 6 is methylene, W may be

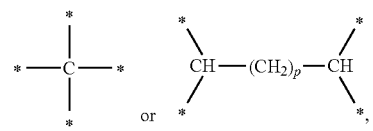

and in a case in which L is the single bond, W may be

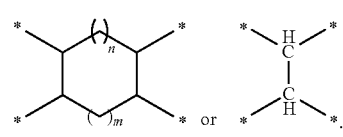

In the electrolyte for a lithium secondary battery according to the exemplary embodiment in the present invention, the cyclic sulfite compound represented by Chemical Formula 6 may be represented by Chemical Formulas 7 to 10.

In the electrolyte for a lithium secondary battery according to the exemplary embodiment of the present invention, the electrolyte may further contain a cyclic sulfite compound represented by the following Chemical Formula 6.

[Chemical Formula 7]
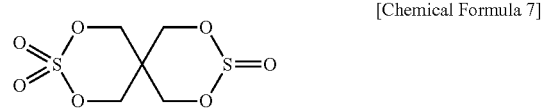

[Chemical Formula 8]

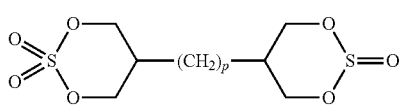

[Chemical Formula 9]

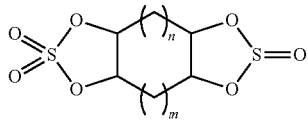

[Chemical Formula 10]

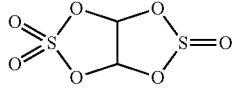

(In the Chemical Formulas, m is an integer of 1 to 4, n is an integer of 0 to 2, and p is an integer of 0 to 6.)

In the electrolyte for a lithium secondary battery according to the exemplary embodiment in the present invention, the cyclic sulfite compound represented by Chemical Formula 8 may be selected from compounds having the following structures, but is not limited thereto.

8-1

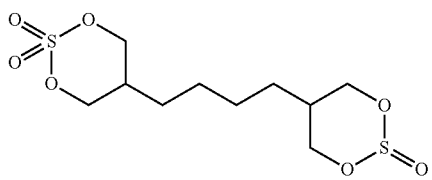

8-2

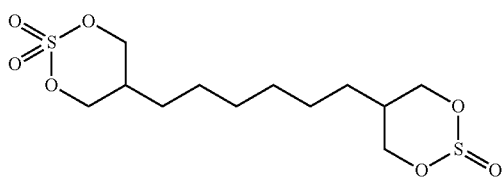

In the electrolyte for a lithium secondary battery according to the exemplary embodiment in the present invention, the cyclic sulfite compound represented by Chemical Formula 9 may be selected from compounds having the following structures, but is not limited thereto.

9-1

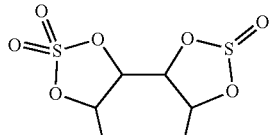

9-2

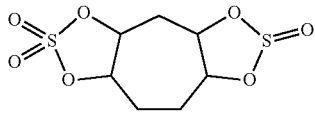

9-3

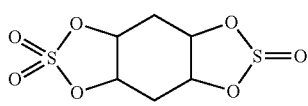

9-4

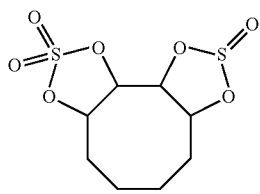

9-5

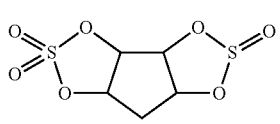

9-6

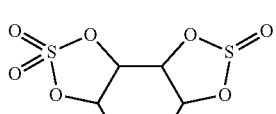

9-7

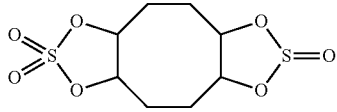

In the electrolyte for a lithium secondary battery according to the exemplary embodiment of the present invention, the cyclic sulfate compound represented by Chemical Formula 1 may be contained at a content of 0.1 to 5.0 wt % based on a total weight of the electrolyte. In view of low-temperature and high-temperature characteristics, it is more preferable that the cyclic sulfate compound is contained at a content of 0.5 to 3 wt %. When the content of the cyclic sulfate compound represented by Chemical Formula 1 is less than 0.1 wt %, addition effects such as suppression of the swelling phenomenon of the battery during high-temperature storage, improvement of a capacity retention rate, or the like, are not exhibited, and an effect of improving discharge capacity, output, or the like, of a lithium secondary battery may be insufficient, and when the content is more than 5.0 wt %, a film may be formed to be excessively thick on a surface of an electrode, and thus a life cycle is rapidly deteriorated due to an increase in resistance of the battery, such that characteristics of the lithium secondary battery may be rather deteriorated.

In the electrolyte for a lithium secondary battery according to the exemplary embodiment of the present invention, the cyclic sulfite compound represented by Chemical Formula 6 may be contained at a content of 0.001 to 20 mol % based on a total mole of the cyclic sulfate compound represented by Chemical Formula 1 and the cyclic sulfite compound represented by Chemical Formula 6. Basic performance such as high-rate charge and discharge characteristics, life cycle characteristics, and the like, high-temperature storage characteristics, and low-temperature discharge characteristics due to the cyclic sulfate compound represented by Chemical Formula 1 are not deteriorated within the above-mentioned range.

The electrolyte for a lithium secondary battery according to the exemplary embodiment of the present invention may further contain one or two or more additives selected from the group consisting of oxalatoborate based compounds, carbonate based compounds substituted with fluorine, vinylidene carbonate based compounds, and compounds containing a sulfinyl group as an additive for improving the life cycle of the battery.

The oxalatoborate based compound may be a compound represented by the following Chemical Formula 11 or lithium bis(oxalato)borate (LiB(C$_2$O$_4$)$_2$, LiBOB).

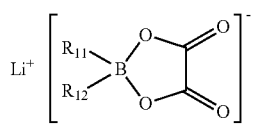

[Chemical Formula 11]

(In Chemical Formula 11, R$_{11}$ and R$_{12}$ are each independently halogen or halogenated (C1 to C10)alkyl.)

Specific examples of the oxalatoborate based additive may include lithium difluoro(oxalato)borate (LiB(C$_2$O$_4$)F$_2$, LiFOB), lithium bis(oxalato)borate (LiB(C$_2$O$_4$)$_2$, LiBOB), and the like.

The carbonate based compound substituted with fluorine may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate based compound may be vinylene carbonate (VC), vinyl ethylene carbonate (VEC), or a mixture thereof.

The compound containing a sulfinyl (S=O) group may be sulfone, sulfite, sulfonate, and sultone (cyclic sulfonate), and the compound may be used alone or a mixture thereof may be used. In detail, the sulfone may be represented by the following Chemical Formula 12 and be divinyl sulfone. The sulfite may be represented by the following Chemical Formula 13 and be ethylene sulfite or propylene sulfite. The sulfonate may be represented by the following Chemical Formula 14 and be diallyl sulfonate. In addition, non-restrictive examples of the sultone may include ethane sultone, propane sultone, butane sultone, ethene sultone, butene sultone, propene sultone, and the like.

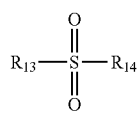

[Chemical Formula 12]

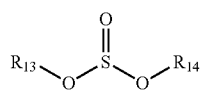

[Chemical Formula 13]

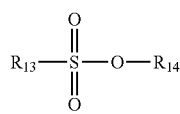

[Chemical Formula 14]

(In Chemical Formulas 12 to 14, R$_{13}$ and R$_{14}$ are each independently hydrogen, halogen, (C1-C10)alkyl, (C2-C10)alkenyl, (C1-C10)alkyl substituted with halogen, or (C2-C10)alkenyl substituted with halogen.)

More preferably, the electrolyte for a lithium secondary battery according to an exemplary embodiment of the present invention may further contain an additive selected from the group consisting of lithium difluoro(oxalato)borate (LiFOB), lithium bis(oxalato)borate (LiB (C$_2$O$_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS). More preferably, the electrolyte may further contain one or two or more additives selected from lithium bis(oxalato)borate (LiB(C$_2$O$_4$)$_2$, LiBOB), vinylene carbonate (VC), vinylethylene carbonate (VEC), ethylene sulfite, ethane sultone, and propane sultone (PS).

In the electrolyte for a lithium secondary battery according to the exemplary embodiment of the present invention, a content of the additive is not particularly limited, but in order to improve the life cycle of the battery, the additive may be contained in the electrolyte for a secondary battery at a content of 0.1 to 5.0 wt %, more preferably 0.1 to 3 wt % based on the total weight of the electrolyte.

In the electrolyte for a lithium secondary battery according to the exemplary embodiment of the present invention, the non-aqueous organic solvent may include carbonate, ester, ether, or ketone alone, or a mixed solvent thereof, but it is preferable that the non-aqueous organic solvent is selected from cyclic carbonate based solvents, linear carbonate based solvents, and a mixed solvent thereof. It is most preferable to use a mixture of the cyclic carbonate based solvent and the linear carbonate based solvent. The cyclic carbonate solvent may sufficiently dissociate lithium ions due to large polarity, but has a disadvantage in that ion conductivity thereof is small due to a large viscosity. Therefore, characteristics of the lithium secondary battery may be optimized by mixing a linear carbonate solvent that has a small polarity and a low viscosity with the cyclic carbonate solvent.

The cyclic carbonate may be selected from the group consisting of ethylene carbonate, propylene carbonate, butylene carbonate, vinylene carbonate, vinylethylene carbonate, fluoroethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte for a lithium secondary battery according to the exemplary embodiment of the present invention, in the non-aqueous organic solvent, which is the mixed solvent of the cyclic carbonate based solvent and the linear carbonate based solvent, a mixed volume ratio of the linear carbonate solvent and the cyclic carbonate solvent may be 1:1 to 9:1, preferably 1.5:1 to 4:1.

In the electrolyte for a lithium secondary battery according to the exemplary embodiment of the present invention, the lithium salt may be one or two or more selected from the group consisting of LiPF$_6$, LiBF$_4$, LiClO$_4$, LiSbF$_6$, LiAsF$_6$, LiN (SO$_2$C$_2$F$_5$)$_2$, LiN (CF$_3$SO$_2$)$_2$, LiN (SO$_3$C$_2$F$_5$)$_2$, LiN (SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$) (C$_y$F$_{2y+1}$SO$_2$) (here, x and y are natural numbers), LiCl, LiI, and LiB(C$_2$O$_4$)$_2$, but is not limited thereto.

The lithium salt may be used in a concentration range of preferably 0.1 to 2.0 M, and more preferably, 0.7 to 1.6M. In the case in which the concentration of the lithium salt is less than 0.1 M, conductivity of the electrolyte is decreased, such that performance of the electrolyte is deteriorated, and in the case in which the concentration is more than 2.0 M, the viscosity of the electrolyte is increased, such that mobility of the lithium ion may be decreased. The lithium salt acts as a supply source of the lithium ion in the battery to enable a basic operation of the lithium secondary battery.

Since the electrolyte for a lithium secondary battery according to the exemplary embodiment of the present invention is stable in a temperature range of −20° C. to 60° C., and maintains electrochemically stable characteristics thereof even at a voltage of 4.4 V, the electrolyte may be applied to all lithium secondary batteries such as a lithium ion battery, a lithium polymer battery, and the like.

In addition, the present invention provides a lithium secondary battery containing the electrolyte for a lithium secondary battery as described above.

A non-restrictive example of the secondary battery may include a lithium metal secondary battery, a lithium ion secondary battery, a lithium polymer secondary battery, a lithium ion polymer secondary battery, or the like.

The lithium secondary battery manufactured using the electrolyte for a lithium secondary battery according to the present invention has low-temperature discharge efficiency of 80% or more and high-temperature storage efficiency of 85% or more, and at the time of keeping the lithium secondary battery at a high temperature for a long period of time, a thickness increase rate of the battery is significantly low (1 to 7%).

The lithium secondary battery according to the present invention includes a cathode and an anode.

It is preferable that the cathode contains a cathode active material capable of intercalating and deintercalating the lithium ion, and it is preferable that the cathode active material as described above is a complex metal oxide of lithium and at least one kind selected from cobalt, manganese, and nickel. A composition rate between the metals may be various, and an element selected from the group consisting of Mg, Al, Co, K, Na, Ca, Si, Ti, Sn, V, Ge, Ga, B, As, Zr, Mn, Cr, Fe, Sr, V, and rare earth elements may be further contained in the cathode active material as well as the above-mentioned metals. As a specific example of the cathode active material, a compound represented by any one of the following Chemical Formulas may be used:

$Li_aA_{1-b}B_bD_2$ (here, $0.90 \leq a \leq 1.8$ and $0 \leq b \leq 0.5$); $Li_aE_{1-b}B_bO_{2-c}D_c$ (here, $0.90 \leq a \leq 1.8$, $0 \leq b \leq 0.5$, and $0 \leq c \leq 0.05$); $LiE_{2-b}B_bO_{4-c}D_c$ (here, $0 \leq b \leq 0.5$ and $0 \leq c \leq 0.05$); $Li_aNi_{1-b-c}Co_bB_cD_\alpha$ (here, $0.90 \leq a\ 1.8$, $0 \leq b \leq 0.5$, $0 \leq c \leq 0.05$, and $0 < \alpha < 2$); $Li_aNi_{1-b-c}Co_bB_cO_{2-\alpha}F_\alpha$ (here, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (here, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (here, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (here, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (here, $0.90 \leq a \leq 1.8$, $0 \leq b \leq 0.5$, $0 \leq c \leq 0.05$, and $0 < \alpha < 2$); $Li_aNi_bE_cG_dO_2$ (here, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (here, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (here, $0.90 \leq a \leq 1.8$ and $0.001 \leq b \leq 0.1$); $Li_aCoG_bO_2$ (here, $0.90 \leq a \leq 1.8$ and $0.001 \leq b \leq 0.1$); $Li_aMnG_bO_2$ (here, $0.90 \leq a \leq 1.8$ and $0.001 \leq b \leq 0.1$); $Li_aMn_2G_bO_4$ (here, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the Chemical Formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The anode contains an anode active material capable of intercalating and deintercalating the lithium ion, and as this anode active material, a carbon material such as crystalloid carbon, amorphous carbon, a carbon complex, a carbon fiber, or the like, a lithium metal, an alloy of lithium and another element, or the like, may be used. Examples of the amorphous carbon may include hard carbon, coke, mesocarbon microbead (MCMB) sintered at a temperature of 1500° C. or less, mesophase pitch-based carbon fiber (MPCF), and the like. Examples of the crystalloid carbon include graphite based materials, more specifically, natural graphite, graphitized coke, graphitized MCMB, graphitized MPCF, and the like. As the carbon material, a material of which a d002 interplanar distance is 3.35 to 3.38 Å, and a crystallite size Lc measured by X-ray diffraction is at least 20 nm or more may be preferable. Another element forming the alloy with lithium may be aluminum, zinc, bismuth, cadmium, antimony, silicon, lead, tin, gallium, or indium.

The cathode or anode may be prepared by dispersing an electrode active material, a binder, and a conductive material, and if necessary, a thickener, in a solvent to prepare an electrode slurry composition, and applying this electrode slurry composition onto an electrode current collector. As a cathode current collector, aluminum, an aluminum alloy, or the like, may be mainly used, and as an anode current collector, copper, a copper alloy, or the like, may be mainly used. The cathode current collector and the anode current collector have a foil or mesh shape.

The binder is a material playing a role in paste formation of the active material, adhesion between the active materials, adhesion with the current collector, and a buffering effect on expansion and contraction of the active material, and the like. Examples of the binder may include polyvinylidene fluoride (PVdF), a polyhexafluoropropylene-polyvinylidene fluoride (PVdF/HFP) copolymer, poly(vinylacetate), polyvinyl alcohol, polyethyleneoxide, polyvinylpyrrolidone, alkylated polyethyleneoxide, polyvinyl ether, poly(methylmethacrylate), poly(ethylacrylate), polytetrafluoroethylene, polyvinylchloride, polyacrylonitrile, polyvinylpyridine, styrene-butadiene rubber, acrylonitrile-butadiene rubber, and the like. A content of the binder is 0.1 to 30 wt %, preferably 1 to 10 wt % based on the electrode active material. In the case in which the content of the binder is excessively low, adhesive force between the electrode active material and the current collector may become insufficient, and in the case in which the content is excessively high, adhesive force may be improved, but a content of the electrode active material is decreased in accordance with the content of the binder, which is disadvantageous in allowing the battery to have high capacity.

The conductive material is used to impart conductivity to the electrode, and any electronic conductive material may be used as long as it does not cause a chemical change in a battery to be configured. At least one selected from the group consisting of a graphite based conductive material, a carbon black based conductive material, and a metal or metal compound based conductive material may be used. Examples of the graphite based conductive material may include artificial graphite, natural graphite, and the like, examples of the carbon black based conductive material may include acetylene black, Ketjen black, Denka black, thermal black, channel black, and the like, and examples of the metal or metal compound based conductive material may include tin, tin oxide, tin phosphate ($SnPO_4$), titanium oxide, potassium titanate, a perovskite material such as $LaSrCoO_3$ and $LaSrMnO_3$. However, the conductive material is not limited thereto.

A content of the conductive material is preferably 0.1 to 10 wt % based on the electrode active material. In the case in which the content of the conductive material is less than 0.1 wt %, electrochemical properties may be deteriorated, and in the case in which the content is more than 10 wt %, energy density per weight may be decreased.

Any thickener may be used without limitation as long as it may serve to adjust a viscosity of the active material slurry, but for example, carboxymethyl cellulose, hydroxymethyl cellulose, hydroxyethyl cellulose, hydroxypropyl cellulose, or the like, may be used.

As the solvent in which the electrode active material, the binder, the conductive material, and the like, are dispersed, a non-aqueous solvent or aqueous solvent may be used. Examples of the non-aqueous solvent may include N-methyl-2-pyrrolidone (NMP), dimethylformamide, dimethylacetamide, N,N-dimethylaminopropylamine, ethyleneoxide, tetrahydrofuran, or the like.

The lithium secondary battery according to the present invention may include a separator preventing a short-circuit between the cathode and the anode and providing a movement path of the lithium ion. As the separator as described above, a polyolefin based polymer membrane made of polypropylene, polyethylene, polyethylene/polypropylene, polyethylene/polypropylene/polyethylene, polypropylene/polyethylene/polypropylene, or the like, or a multilayer thereof, a micro-porous film, and woven fabric and non-woven fabric may be used. In addition, a film in which a resin having excellent stability is coated on a porous polyolefin film may be used.

The lithium secondary battery according to the present invention may have various shapes such as a cylindrical shape, a pouch shape, in addition to an angular shape.

Hereinafter, Examples and Comparative Examples of the present invention will be described. However, the following Example is only a preferable example of the present invention, and the present invention is not limited thereto. Under the assumption that the lithium salt is entirely dissociated so that a concentration of lithium ion becomes 1 M, a base electrolyte may be formed by dissolving a corresponding amount of the lithium salt such as $LiPF_6$ in a basic solvent so as to have a concentration of 1 M.

EXAMPLE 1

Synthesis of Compound Represented by Chemical Formula 2

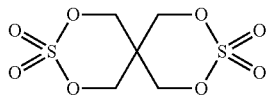

13.6 g of pentaerythritol, 100 ml of tetrahydrofuran, and 18 ml of thionyl chloride were sequentially injected into a 250 ml flask, and the mixture was refluxed and stirred. Formed hydrogen chloride gas was neutralized by passing through an aqueous sodium hydroxide solution. A crystal formed by stirring overnight was filtered, and the crystal was washed with 100 ml of diethylether three times. After the crystal was put into a 250 ml flask, 104 mg of ruthenium chloride ($RuCl_3$) and 50 ml of acetonitrile was injected thereinto. After a reactant was cooled using an ice bath, 140 ml of 10% aqueous sodium hypochlorite solution was slowly injected thereto and stirred for 30 minutes, and then, a reaction was terminated by adding 630 mg of sodium sulfite ($Na_2SO_3$) thereto. Acetonitrile was removed by distillation under reduced pressure, and the formed solid was filtered. The obtained solid was washed with 100 ml of water two times, and dried using a vacuum oven, thereby obtaining the title compound (18 g).

$^1$H-NMR (500 MHz, DMSO) δ: 4.90 (s, 8H)

EXAMPLE 2

Synthesis of Compound Represented by Chemical Formula 5

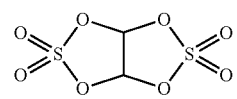

After 2.4 g of mercury sulfate ($HgSO_4$) and 100 g of tetrachloroethane were sequentially injected into a 1 L flask, 400 g of 65% fuming sulfuric acid was slowly injected thereinto for 2 hours under $N_2$ atmosphere. After injection was terminated, stirring was performed for 8 hours while maintaining a temperature at 60° C. When the stirring was completed, the reactant was slowly poured into a 2 L beaker charged with 1 L of ice water, and a white crystal formed by stirring the mixture for 1 hour was filtered. The obtained crystal was washed with 500 ml of cool water four times, and dried using a vacuum oven, thereby obtaining the title compound (90 g).

$^1$H-NMR (500 MHz, DMSO) δ: 8.15 (s, 2H).

EXAMPLE 3

Synthesis of Compound Represented by Chemical Formula 4-7

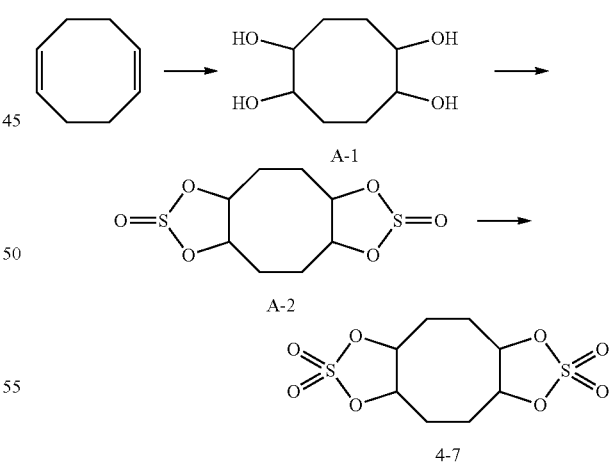

5.03 g of 1,5-cyclooctadiene, 50 ml of acetone, and 58 mg of osmium tetraoxide ($OsO_4$) were sequentially injected into a 100 ml flask, and cooled using an ice bath. 13.5 g of N-methylmorpholine N-oxide and 12.5 ml of water were injected thereinto, and then stirred for 1 hour. When the stirring was completed, a reaction temperature was raised to room temperature by removing the ice bath, and the mixture was stirred for 18 hours. The formed solid was filtered, washed with 20 ml of acetone, stirred together with 3 ml of water and 30 ml of acetonitrile for 2 hours, and then filtered. After removing the remaining water by boiling the obtained solid together with toluene, the remaining toluene was removed by vacuum drying, thereby obtaining 4.2 g of cyclooctane-1,2,5,6-tetraol (A-1).

After 4 g of cyclooctane-1,2,5,6-tetraol (A-1) and 40 ml of tetrahydrofuran were sequentially injected into a 100 ml flask and cooled using an ice bath, 5.9 g of thionyl chloride was slowly injected thereinto, followed by stirring for 1 hour. Thereafter, a temperature was raised to room temperature, and the mixture was stirred for 2 hours. When the stirring was completed, the reactant was slowly injected into 400 ml of saturated aqueous sodium bicarbonate solution at 0° C. Gas was generated during this process, and when generation of gas was terminated, an organic layer was extracted two times by injecting 100 ml of ethyl acetate. The organic layer was washed with 100 ml of saturated aqueous sodium chloride solution, dried over sodium sulfate, and concentrated, thereby obtaining 5.12 g of cyclic sulfite (A-2).

4.8 g of cyclic sulfite (A-2), 30 ml of acetonitrile, 37 mg of ruthenium chloride, and 8.4 g of sodium periodate ($NaIO_4$) were sequentially injected into a 100 ml flask, and cooled using an ice bath. 15 ml of ice water was slowly injected thereinto, and when a green solid was formed, a reaction temperature was raised to room temperature by removing the ice bath. After 2 hours, extraction was performed using water and dichloromethane, and an organic layer was washed with a saturated aqueous sodium chloride solution, dried over sodium sulfate, and concentrated, thereby obtaining a solid. The obtained solid was stirred in tetrahydrofuran, thereby obtaining the title compound (1.4 g).

$^1$H-NMR (500 MHz, DMSO) δ: 5.41 (d, J=7.6 Hz, 4H), 2.33-2.27 (m, 4H), 2.04-1.98 (m, 4H)

EXAMPLES 4 TO 20 AND COMPARATIVE EXAMPLES 1 AND 2

Manufacturing of Lithium Secondary Battery

A solution obtained by dissolving $LiPF_6$ in a mixed solvent in which ethylene carbonate (EC) and ethyl methyl carbonate (EMC) were mixed at a volume ratio of 3:7 so as to have a concentration of 1.0 M was used as a basic electrolyte (1M $LiPF_6$, EC/EMC=3:7), and ingredients shown in the following Table 1 were additionally injected, thereby preparing electrolytes.

A battery to which the non-aqueous electrolyte was applied was manufactured as follows.

After mixing $LiNiCoMnO_2$ and $LiMn_2O_4$ at a weight ratio of 1:1 as a cathode active material, the cathode active material, polyvinylidene fluoride (PVdF) as a binder, and carbon as a conductive material were mixed at a weight ratio of 92:4:4 and then dispersed in N-methyl-2-pyrrolidone, thereby preparing cathode slurry. This slurry was coated on aluminum foil having a thickness of 20 μm, dried, and rolled, thereby preparing a cathode. After artificial graphite as an anode active material, styrene-butadiene rubber as a binder, and carboxymethyl cellulose as a thickener were mixed at a weight ratio of 96:2:2, the mixture was dispersed in water, thereby preparing anode active material slurry. This slurry was coated on copper foil having a thickness of 15 μm, dried, and rolled, thereby preparing an anode.

A film separator made of a polyethylene (PE) material and having a thickness of 25 μm was stacked between the manufactured electrodes, and a cell was configured using a pouch having a size of 8 mm×270 mm×185 mm (thickness×width×length), followed by injection of the non-aqueous electrolyte, thereby manufacturing a 25 Ah-class lithium secondary battery for an electric vehicle (EV).

Performance of the 25 Ah-class lithium secondary battery for an electric vehicle (EV) manufactured as described above was evaluated as follows. Evaluation items are as follows.

* Evaluation Item *

1. Capacity Recovery Rate after 30 days at 60° C. (High-Temperature Storage Efficiency): After the battery was charged at room temperature for 3 hours (25 A, 4.2 V, constant current and constant voltage (CC-CV)), the battery was kept at 60° C. for 30 days, and then the battery was discharged to 2.7 V (25 A, CC). Then, usable capacity (%) with respect to initial capacity was measured.

2. Thickness Increase Rate after 30 days at 60° C.: When a thickness of the battery after charging the battery at room temperature for 3 hours (25 A, 4.2 V, CC-CV) was defined as A, and a thickness of a battery after being left at 60° C. under atmospheric pressure for 30 days using a sealed thermostatic device is B, an increase rate of thickness was calculated as shown in Equation 1 below.

$$(B-A)/A*100(\%) \qquad \text{[Equation 1]}$$

3. Life Cycle at Room Temperature A process of charging the battery at room temperature (50 A, 4.2 V, CC-CV) for 3 hours and then discharging the battery to 2.7V (50 A) was repeated 500 times. In this case, discharge capacity at a first cycle was defined as C, and discharge capacity at 500th cycle was divided by the discharge capacity C at the first cycle, thereby calculating a capacity retention rate during the life cycle.

4. 1C Discharge at −20° C. (Low-Temperature Discharge Efficiency): After the battery was charged at room temperature for 3 hours (25 A, 4.4 V CC-CV), the battery was kept at −20° C. for 4 hours, and then, the battery was discharged to 2.7 V (25 A, CC). Thereafter, usable capacity (%) with respect to initial capacity was measured.

TABLE 1

| | | Electrolyte Composition (100 wt %) | After 30 Days at 60° C. | | Capacity Retention Rate during Life cycle | Discharge Capacity (at −20° C.) |
|---|---|---|---|---|---|---|
| | | | Capacity Recovery Rate | Thickness Increase Rate | | |
| Example 4 | | Basic Electrolyte + Compound Represented by Chemical Formula 2 (0.5 wt %) | 92% | 5% | 92% | 85% |
| Example 5 | | Basic Electrolyte + Compound Represented by Chemical Formula 2 (1 wt %) | 94% | 3% | 95% | 90% |

TABLE 1-continued

|  | Electrolyte Composition (100 wt %) | After 30 Days at 60° C. Capacity Recovery Rate | After 30 Days at 60° C. Thickness Increase Rate | Capacity Retention Rate during Life cycle | Discharge Capacity (at -20° C.) |
| --- | --- | --- | --- | --- | --- |
| Example 6 | Basic Electrolyte + Compound Represented by Chemical Formula 2 (2 wt %) | 95% | 1% | 94% | 89% |
| Example 7 | Basic Electrolyte + Compound Represented by Chemical Formula 2 (3 wt %) | 95% | 1% | 90% | 87% |
| Example 8 | Basic Electrolyte + Compound Represented by Chemical Formula 2 (1 wt %) + VC (1 wt %) | 96% | 2% | 97% | 84% |
| Example 9 | Basic Electrolyte + Compound Represented by Chemical Formula 2 (1 wt %) + VC (1 wt %) + PS (1 wt %) | 97% | 1% | 97% | 82% |
| Example 10 | Basic Electrolyte + Compound Represented by Chemical Formula 2 (1 wt %) + VC (1 wt %) + LiBOB (1 wt %) | 98% | 2% | 97% | 85% |
| Example 11 | Basic Electrolyte + [Compound Represented by Chemical Formula 2 (95 mol %) + cyclic sulfite A (5 mol %)] (2 wt %) | 94% | 1% | 94% | 88% |
| Example 12 | Basic Electrolyte + [Compound Represented by Chemical Formula 2 (90 mol %) + cyclic sulfite A (10 mol %)] (2 wt %) | 95% | 1% | 93% | 89% |
| Example 13 | Basic Electrolyte + Compound Represented by Chemical Formula 5 (0.5 wt %) | 92% | 6% | 92% | 87% |
| Example 14 | Basic Electrolyte + Compound Represented by Chemical Formula 5 (1 wt %) | 94% | 5% | 95% | 91% |
| Example 15 | Basic Electrolyte + Compound Represented by Chemical Formula 5 (2 wt %) | 95% | 2% | 94% | 88% |
| Example 16 | Basic Electrolyte + Compound Represented by Chemical Formula 5 (3 wt %) | 95% | 1% | 90% | 85% |
| Example 17 | Basic Electrolyte + Compound Represented by Chemical Formula 4-7 (1 wt %) | 88% | 7% | 90% | 88% |
| Example 18 | Basic Electrolyte + Compound Represented by Chemical Formula 5 (1 wt %) + VC (1 wt %) | 95% | 4% | 96% | 86% |
| Example 19 | Basic Electrolyte + Compound Represented by Chemical Formula 5 (1 wt %) + VC (1 wt %) + PS (1 wt %) | 96% | 1% | 97% | 82% |
| Example 20 | Basic Electrolyte + Compound Represented by Chemical Formula 5 (1 wt %) + VC (1 wt %) + LiBOB (1 wt %) | 97% | 2% | 97% | 85% |
| Comparative Example 1 | Basic Electrolyte | 37% | 30% | 20% | 55% |
| Comparative Example 2 | Basic Electrolyte + VC (1 wt %) + PS (1 wt %) | 60% | 12% | 61% | 48% |

Basic Electrolyte: 1M LiPF$_6$, EC/EMC = 3:7

Cyclic sulfite A: 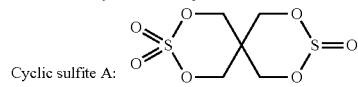

LiBOB: Lithium-bis(Oxalato)Borate
VC: Vinylene carbonate
PS: 1,3-propane sultone As illustrated in Table 1, it may be appreciated that the lithium secondary battery containing the electrolyte for a lithium secondary battery according to the present invention had excellent low-temperature discharge efficiency of 80% or more and excellent high-temperature storage efficiency of 85% or more. Further, it was confirmed that in Examples 4 to 20, the thickness increase rate of the battery at the time of keeping the battery at a high temperature for a long period of time was significantly low (1 to 7%) and the capacity retention rate during the life cycle was excellent (90% or more). On the contrary, it was confirmed that in Comparative Examples 1 and 2 in which the cyclic sulfate compound represented by Chemical Formula 1 according to the present invention was not contained, the low-temperature discharge efficiency was low (55% or less), the high-temperature storage efficiency was low (60% or less), and at the same time, the thickness increase rate of the battery at the time of keeping the battery at the high temperature for the long period of time was increased to 12 to 30%. In addition, it was confirmed that in Comparative Example 1, the capacity retention rate during the life cycle was 20%, and in Comparative Example 2, the capacity retention rate during the life cycle was 61%, such that the low-temperature discharge efficiency, the high-temperature storage efficiency, and life cycle characteristics were not good.

Therefore, it may be appreciated that the lithium secondary battery containing the electrolyte for a lithium secondary battery according to the present invention had significantly excellent high-temperature stability due to a high capacity recovery rate at 60° C. after 30 days and a low thickness increase rate, and had excellent low-temperature characteristics due to a significantly high discharge capacity at -20° C. and a significantly high capacity retention rate during the life cycle. Therefore, it may be confirmed that high-temperature stability and low-temperature discharge capacity of the lithium secondary battery were improved by the cyclic sulfate compound represented by Chemical Formula 1 contained in the electrolyte for a lithium secondary battery according to the present invention.

In addition, it may be appreciated that the electrolyte for a secondary battery according to the present invention further contains one or more additives selected from lithium bis(oxalato)borate (LiB(C$_2$O$_4$)$_2$, LiBOB), vinylene carbonate (VC), vinylethylene carbonate (VEC), ethylene sulfite, ethane sultone, propane sultone (PS) in addition to the cyclic sulfate compound represented by Chemical Formula 1, such that high-temperature storage stability, low-temperature discharge capacity, and life cycle characteristics may be further improved.

Further, it was confirmed that in Examples 11 and 12 in which a mixture of the cyclic sulfate compound represented by Chemical Formula 1 and the cyclic sulfite compound represented by Chemical Formula 6 was used, low-temperature discharge efficiency, high-temperature storage efficiency, the thickness increase rate of the battery at the time of keeping the battery at a high temperature, and life cycle characteristics were equivalent to those in Example 6 in which the cyclic sulfate compound represented by Chemical Formula 1 was used. Therefore, it may be confirmed that high-temperature stability and low-temperature discharge capacity of the lithium secondary battery were improved by the cyclic sulfate compound represented by Chemical Formula 1 contained in the electrolyte for a lithium secondary battery according to the present invention.

The electrolyte for a lithium secondary battery according to the present invention contains the cyclic sulfate compound represented by Chemical Formula 1, such that a swelling phenomenon that the battery is swelled at a high temperature may be significantly decreased, and thus, the electrolyte may have excellent high-temperature storage characteristics.

The electrolyte for a lithium secondary battery according to the present invention contains the cyclic sulfate compound in which two cyclic sulfates are connected via a spiro bond, fused with each other, or linked with each other via a single bond or alkylene, such that the electrolyte may be decomposed at the anode to efficiently form the SEI film while lowering resistance of the battery, thereby making it possible to significantly increase low-temperature discharge capacity as well as the high-temperature capacity recovery rate.

In addition, the electrolyte for a lithium secondary battery according to the present invention contains the compound represented by Chemical Formula 1 and further contains one or two or more additional additives selected from the group consisting of the oxalatoborate based compounds, the carbonate based compounds substituted with fluorine, the vinylidene carbonate based compounds, and the compounds containing a sulfinyl group, such that the electrolyte may have more excellent life cycle characteristics, high-temperature stability, and low-temperature characteristics.

Furthermore, the lithium secondary battery according to the present invention uses the electrolyte for a lithium secondary battery according to the present invention, containing the cyclic sulfate compound represented by Chemical Formula 1, such that the lithium secondary battery has excellent high-temperature storage stability and low-temperature characteristics while maintaining excellent basic performance such as high-efficiency charge and discharge characteristics, life cycle characteristics, and the like.

Although the exemplary embodiments of the present invention have been disclosed in detail, those skilled in the art will appreciate that various modifications are possible, without departing from the scope and spirit of the invention as disclosed in the accompanying claims. Accordingly, such modifications of the exemplary embodiment of the present invention should also be understood to fall within the scope of the present invention.

What is claimed is:

1. An electrolyte for a secondary battery comprising:

a lithium salt;

a non-aqueous organic solvent; and a cyclic sulfate compound represented by the following Chemical Formula 2, 3, 4 or 5:

[Chemical Formula 2]

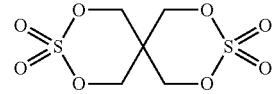

[Chemical Formula 3]

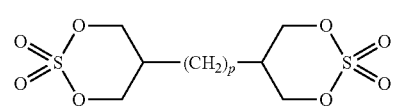

[Chemical Formula 4]

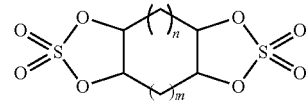

[Chemical Formula 5]

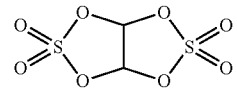

wherein, in the Chemical Formulas, m is an integer of 1 to 4, n is an integer of 0 to 2, and p is an integer of 0 to 6.

2. The electrolyte for a second battery of claim 1, wherein the cyclic sulfate compound represented by Chemical Formula 3 is selected from compounds having the following structures:

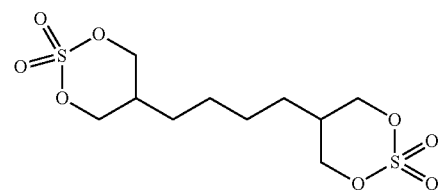

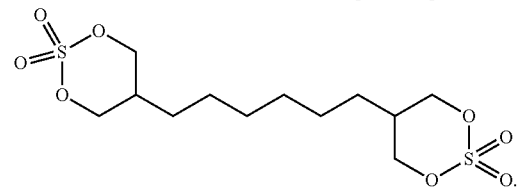

3. The electrolyte for a second battery of claim 1, wherein the cyclic sulfate compound represented by Chemical Formula 4 is selected from compounds having the following structures:

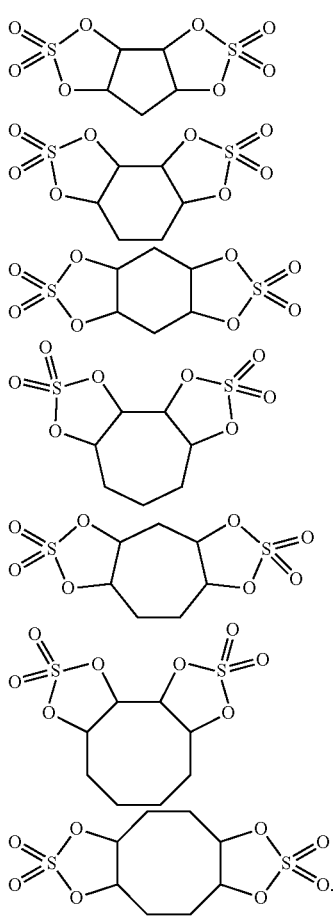

4. The electrolyte for a second battery of claim 1, further comprising a cyclic sulfite compound represented by Chemical Formula 6:

[Chemical Formula 6]

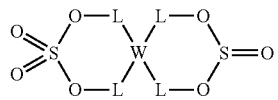

wherein, in Chemical Formula 6,
W is

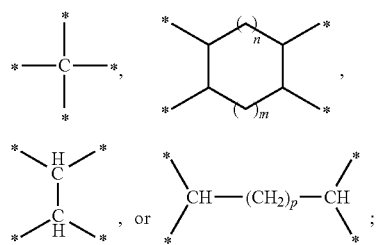

L is a single bond or methylene; and
m is an integer of 1 to 4, n is an integer of 0 to 2, and p is an integer of 0 to 6.

5. The electrolyte for a secondary battery of claim 4, wherein the cyclic sulfite compound represented by Chemical Formula 6 is represented by the following Chemical Formula 7, 8, 9 or 10:

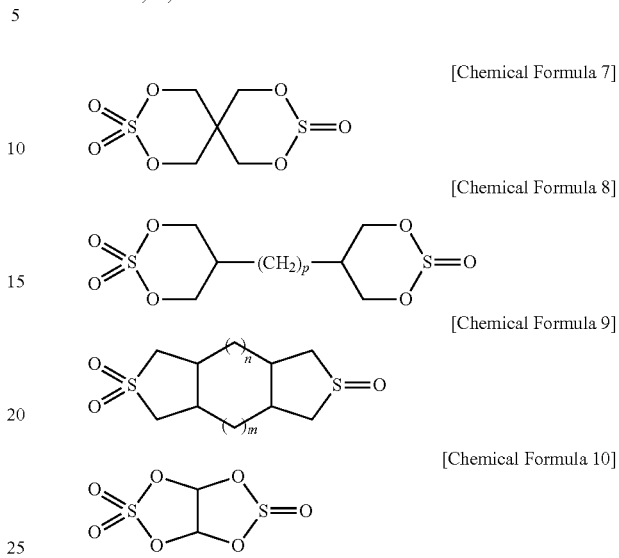

[Chemical Formula 7]

[Chemical Formula 8]

[Chemical Formula 9]

[Chemical Formula 10]

wherein, in the Chemical Formulas, m is an integer of 1 to 4, n is an integer of 0 to 2, and p is an integer of 0 to 6.

6. The electrolyte for a secondary battery of claim 5, wherein the cyclic sulfite compound represented by Chemical Formula 8 is selected from compounds having the following structures:

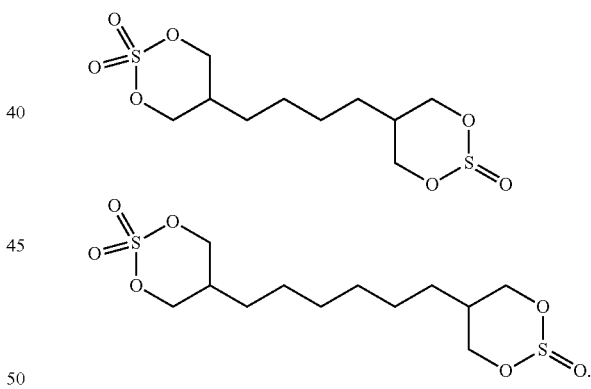

7. The electrolyte for a secondary battery of claim 5, wherein the cyclic sulfite compound represented by Chemical Formula 9 is selected from compounds having the following structures:

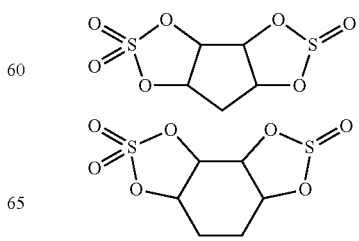

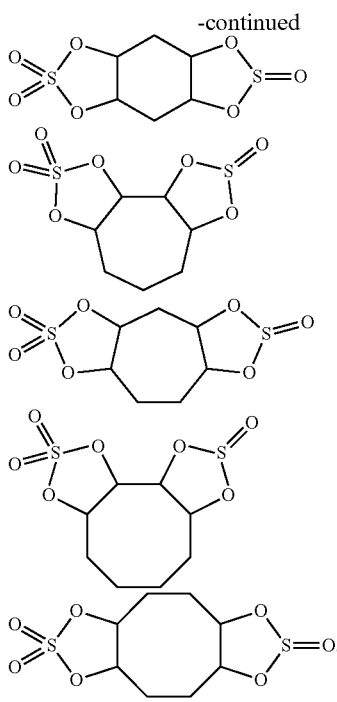

8. The electrolyte for a secondary battery of claim 1, wherein the cyclic sulfate compound is contained at a content of 0.1 to 5.0 wt % based on a total weight of the electrolyte.

9. The electrolyte for a secondary battery of claim 4, wherein the cyclic sulfite compound is contained at a content of 0.001 to 20 mol % based on a total mole of the cyclic sulfate compound and the cyclic sulfite compound.

10. The electrolyte for a secondary battery of claim 1, further comprising one or two or more additives selected from the group consisting of oxalatoborate based compounds, carbonate based compounds substituted with fluorine, vinylidene carbonate based compounds, and compounds containing a sulfinyl group.

11. The electrolyte for a secondary battery of claim 10, further comprising an additive selected from the group consisting of lithium difluoro(oxalato)borate (LiFOB), lithium bis(oxalato)borate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

12. The electrolyte for a secondary battery of claim 10, wherein the additive is contained at a content of 0.1 to 5.0 wt % based on a total weight of the electrolyte.

13. The electrolyte for a secondary battery of claim 1, wherein the non-aqueous organic solvent is selected from cyclic carbonate based solvents, linear carbonate based solvents, and a mixed solvent thereof.

14. The electrolyte for a secondary battery of claim 13, wherein the cyclic carbonate is selected from the group consisting of ethylene carbonate, propylene carbonate, butylene carbonate, vinylene carbonate, vinylethylene carbonate, fluoroethylene carbonate, and a mixture thereof, and the linear carbonate is selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

15. The electrolyte for a secondary battery of claim 13, wherein the non-aqueous organic solvent is a mixed solvent in which the linear carbonate solvent and the cyclic carbonate solvent are mixed at a mixed volume ratio of 1:1 to 9:1.

16. The electrolyte for a secondary battery of claim 1, wherein the lithium salt is one or two or more selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiN(SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$) (here, x and y are natural numbers), LiCl, LiI, and LiB(C$_2$O$_4$)$_2$.

17. The electrolyte for a secondary battery of claim 1, wherein the lithium salt is contained at a concentration of 0.1 to 2.0 M.

18. A lithium secondary battery comprising the electrolyte for a secondary battery of claim 1.

* * * * *